(12) United States Patent
Toebes et al.

(10) Patent No.: US 8,458,034 B2
(45) Date of Patent: Jun. 4, 2013

(54) SELECTING ADVERTISEMENTS AND PRESENTATIONS TO PRESENT BASED ON KNOWN AUDIENCE PROFILES

(75) Inventors: John A. Toebes, Cary, NC (US); Glenn T. Millican, III, Mountain View, CA (US); John C. Davi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 474 days.

(21) Appl. No.: 12/725,659

(22) Filed: Mar. 17, 2010

(65) Prior Publication Data

US 2011/0231873 A1      Sep. 22, 2011

(51) Int. Cl.
*G06Q 30/00* (2012.01)
*H04H 9/00* (2006.01)
*H04H 7/16* (2011.01)
*H04H 7/10* (2006.01)

(52) U.S. Cl.
USPC ............ 705/14.58; 705/14.5; 705/14.66; 705/14.67; 725/9; 725/10; 725/22; 725/23; 725/32; 725/34; 725/35; 725/36

(58) Field of Classification Search
USPC ... 725/9, 10, 22, 23, 32, 34, 35, 36; 705/14.5, 705/14.58, 14.66, 14.67
See application file for complete search history.

(56) References Cited

U.S. PATENT DOCUMENTS

| | | | |
|---|---|---|---|
| 6,047,327 A | 4/2000 | Tso | |
| 7,305,691 B2 * | 12/2007 | Cristofalo | 725/34 |
| 7,636,672 B2 | 12/2009 | Angles | |
| 7,945,585 B1 | 5/2011 | Sorkin | |
| 7,949,722 B1 * | 5/2011 | Ullman et al. | 709/217 |
| 2006/0116924 A1 | 6/2006 | Angles | |
| 2010/0079336 A1 * | 4/2010 | Skibiski et al. | 342/357.07 |
| 2010/0106801 A1 * | 4/2010 | Bliss et al. | 709/219 |
| 2011/0201355 A1 * | 8/2011 | Hansson | 455/456.1 |

* cited by examiner

*Primary Examiner* — Hoang-Vu A Nguyen-Ba
(74) *Attorney, Agent, or Firm* — P. Su

(57) ABSTRACT

In one embodiment, a method includes determining a group identity for an audience associated with an event, accessing a plurality of announcements, identifying at least one announcement of the plurality of announcements based on the group identity, and providing the identified announcement to the audience at the event. The group identity is indicative of at least one characteristic of the audience. The plurality of announcements are processed to identify at least one announcement that approximately matches the group identity.

24 Claims, 5 Drawing Sheets

SELECTING ADVERTISEMENTS AND PRESENTATIONS TO PRESENT BASED ON KNOWN AUDIENCE PROFILES

BACKGROUND

The disclosure relates generally to efficiently delivering advertising to consumers, and, more particularly, to utilizing profile information relating to audience members in order to target advertisements and/or presentations to the audience members.

Advertising is often targeted towards the general demographic of the consumers of a product that the advertising is effectively grouped with. For example, advertising shown in a movie theater before a G-rated movie may be targeted to a general demographic of young children and their parents, while advertising shown in a movie theater before an R-rated movie may be targeted to a general demographic of adults. The demographics of an audience in attendance at a G-rated movie is likely to be vastly different from the demographics of an audience in attendance at an R-rated movie.

In general, targeted advertising is such that the targeted advertising is tied to a particular product, e.g., a particular G-rated movie. As such, a movie theater often shows the same advertisements for each showing of a particular movie. An assumption is effectively made that the majority of the audience at each showing of a particular movie is likely to be interested in the same advertising based on implied shared interests and/or affiliations between advertised products and the movie being viewed. This form of advertising is often referred to as "contextual advertising," with the advertising chosen based on the anticipated demographics of the intended audience for the movie.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
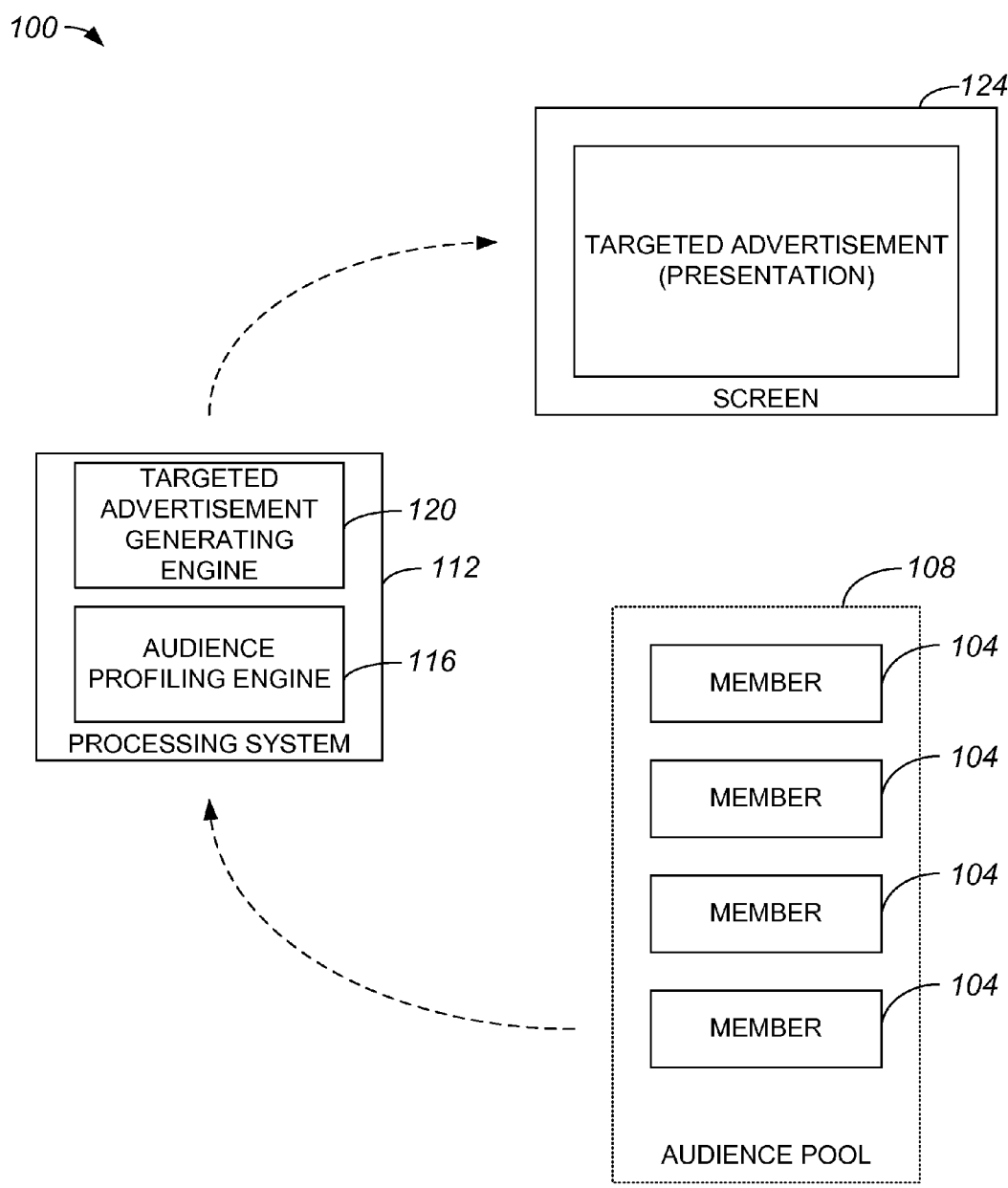
FIG. 1 is a diagrammatic representation of a system in which advertisements and/or presentations are targeted to an audience based on the profile of the audience in accordance with an embodiment.

According to one aspect, a method includes determining a group identity for an audience associated with an event, accessing a plurality of announcements, identifying at least one announcement of the plurality of announcements based on the group identity, and providing the identified announcement to the audience at the event. The group identity is indicative of at least one measured characteristic of the audience. The plurality of announcements are processed to identify at least one announcement that approximately matches the group identity.

Description

The ability to target advertisements, e.g., advertisements for products, and presentations, e.g., multi-media presentations or slide shows, to specific groups enhances the odds that particular groups have access to advertisements and presentations that are likely to be relevant to the groups. As the use of digital delivery systems to provide advertisements and presentations becomes prevalent, the ability to efficiently target advertisements and presentations to a specific, "target" audience increases. For example, advertisements and/or presentations that are appropriate to a target audience may be identified from an overall pool of advertisements and/or presentations, and delivered, e.g., digitally delivered, for presentation to the target audience when the composition of the target audience is known. Thus, using information relating to an audience, e.g., an audience located at a concentrated location, media that is particularly appropriate to the audience may be selected and effectively delivered to the audience.

In one embodiment, a system selects advertisements and/or presentations to present to a group, e.g., an audience, based upon aggregated characteristics of the group. That is, a system selects advertisements and/or presentations to render to a group based upon a group identity that is determined for the group based upon profiles of the members of the group, and an analysis of the group identity. A group may generally include all members of an audience. Alternatively, however, a group may essentially be a subset of all members of an audience, e.g., a group may include key individuals identified from the audience. A group may include any suitable set or subset of members of an audience. For example, a group may include a subset of key individuals identified from an audience, or may include a set of randomly selected members of the audience.

A group identity is determined based at least in part upon the personal profiles of the members of the group and is, thus, based at least partially upon the substantially specific demographic of the group. By way of example, if the group is an audience in a movie theater, the group identity may be based on the demographics of the actual people in the audience using profile information associated with the actual people. Thus, the group identity may be representative of a composite audience member.

The personal profile of a group member typically may have demographic information of the group member tied thereto. Further, the personal profile of a group member may be associated with an online identity of the group member such as when they purchase their movie ticket through an online service such as "Fandango". In general, an online identity may have past or historical behaviors tied thereto. That is, the personal profile of a group member may include behavioral information that is indicative of the past behavior and, hence, the habits of the group member. For instance, in the context of an online identity that is used by an individual to purchase movie tickets, the online identity may identify past movies to which the individual has purchased tickets.

A system which uses audience profile information to provide targeted advertisements and/or presentations or, more generally, targeted media to an audience may generally analyze or otherwise evaluate the audience profile information to identify appropriate advertisements and/or presentations to render to the audience. Referring initially to FIG. 1, a system which targets advertisements and/or presentations to an audience based on the profile of the audience will be described in accordance with an embodiment. A system 100 includes an audience 108, a processing system 112, and a presentation apparatus 124, e.g., a display screen. Although system 100 may be associated with an overall system that provides targeted advertising for display to a movie audience, it should be appreciated that system 100 is not limited to being associated with such a system. In general, system 100 may be arranged to provide targeted advertisements and/or presentations in any context that involves rendering advertisements and/or presentations to an audience. By way of example, system 100 may be arranged to provide targeted advertisements and/or presentations for display at events including, but not limited to including, sports event, concert events, or other social events. System 100 may also be arranged to provide targeted advertisements and/or presentations for display, e.g., on display monitors or screens, at substantially any venue at which a group of people may gather, e.g., an airport departure lounge where the individuals may be readily identified by their ticket information.

An audience 108 includes a number of members 104. Members 104 may generally be individuals who are identifiable. By way of example, members 104 may include, but are not limited to including, individuals who may be identified by location-aware devices and individuals who may be identified because they have performed an action which associates them with being in audience 108. Actions that a member 104 may perform which associates them with being in audience 108 may include purchasing tickets to an event that audience 108 attends and/or using a credit card to purchase concessions sold to audience 108. For instance, if audience 108 is an audience at a showing of a movie, a member 104 may be identified as being part of audience 108 if a credit card issued to the member 104 is used to purchase tickets to the showing, or if the member 104 logs into an online website using his or her login information to purchase tickets to the showing.

It should be appreciated that an identifiable individual is not limited to being an individual that is identified by name of identification number. Rather, an identifiable individual may also be identified as an "entity" with at least one attribute. That is, an identifiable individual is generally an individual with at least one attribute or characteristic that is known or at least inferred. For example, an individual who purchases a child-sized drink at a movie concession stand may be identified as an entity with a child.

At least some members 104 have associated profile information. The profile information may generally be any information that is indicative of a characteristic or attribute of a member 104, e.g., an income level or a sex of the member 104. Generally, profile information may include demographic information and behavioral information.

In one embodiment, profile information of a member 104 may also include historical information relating to the member 104. By way of example, if profile information of a member 104 is obtained from an online account that member 104 frequently uses to purchase tickets to movies, the profile information may include information relating to movies the member 104 has previously seen.

Processing system 112, which may generally be a computing system, is configured to process profile information associated with member 104. An audience profiling engine 116 of processing system 112 may use profile information relating to members 104 to generate an aggregate profile, or a group identity, for audience 108. Audience profiling engine 116 may use any suitable aggregation method to generate an aggregate profile for audience 108. For example, audience profiling engine 116 may generate an aggregate profile that is effectively an average of all available audience profiles, or audience profiling engine 116 may identify the most prevalent attributes in the available audience profiles, and generate an aggregate profile that is indicative of the most prevalent attributes. Additionally, audience profiling engine 116 may select a single individual if that individual is deemed to have a higher value for targeting than the aggregated audience. By way of example, if a single individual in an audience has been identified as someone who has been aggressively shopping for a new car, targeting advertisements and/or presentations to that single individual may be determined to have a better return on investment than targeting advertisements and/or presentations to the audience as a whole.

Processing system 112 also includes a targeted advertisement generating engine 120 that is arranged to select advertisements and/or presentations for rendering to audience 108 based upon the aggregate profile or group identity. That is, targeted advertisement generating engine 120 uses an aggregate profile generated by audience profiling engine 116 to identify advertisements and/or presentations that are particularly suited to audience 108. Advertisements and/or presentations identified by targeted advertisement generating engine 120 may be rendered on a screen 124 for viewing by audience 108.

Targeted advertisement generating engine 120 may be arranged to index into a database (not shown) of available advertisements and/or presentations using information associated with the aggregate profile. In one embodiment, advertisements and/or presentations may be stored in a database (not shown) with tags, metadata, or other indicators which identify attributes associated with the advertisements and/or presentations. Such tags, metadata, or other indicators may be used to identify advertisements and/or presentations that are appropriate for the attributes associated with the aggregate profile of audience 108.

Figure 2:
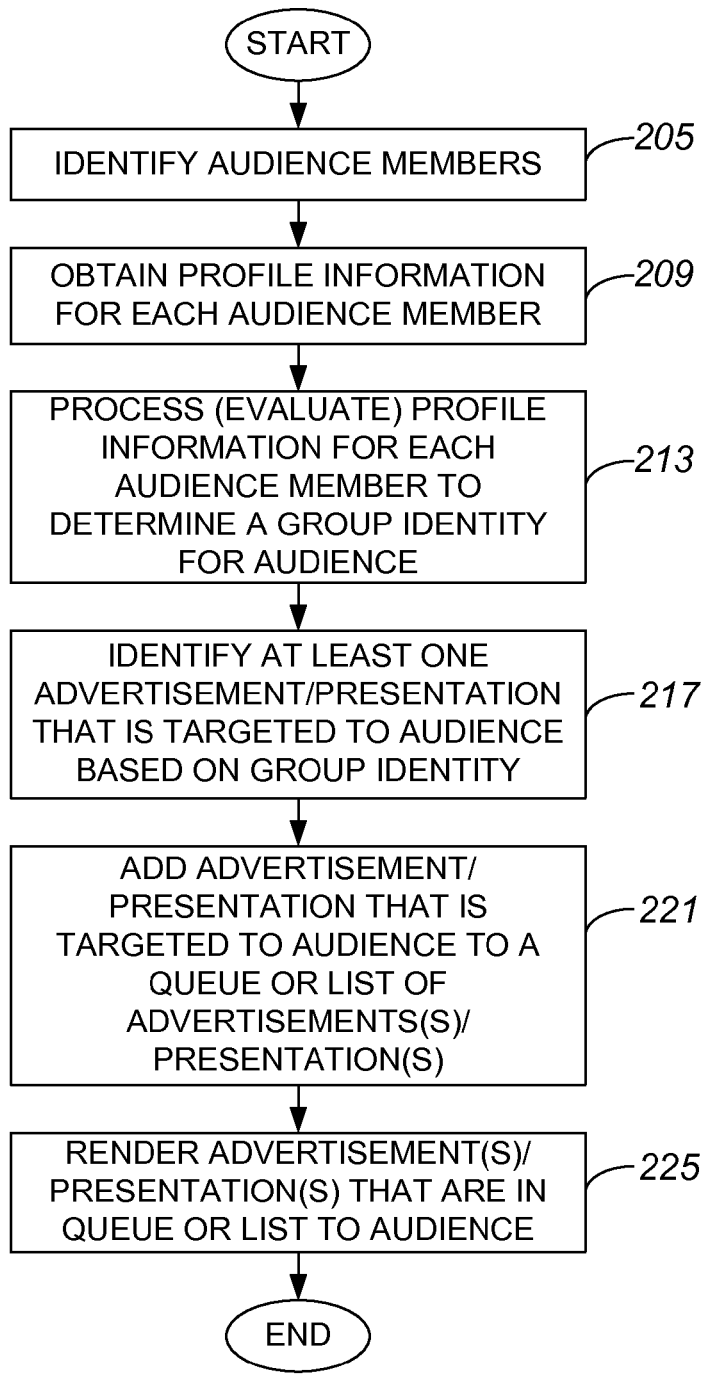
FIG. 2 is a process flow diagram which illustrates a general method of targeting an advertisement and/or presentation to an audience based on a profile of the audience will be described in accordance with an embodiment.

With reference to FIG. 2, a general method of targeting an advertisement and/or presentation to an audience using profile information associated with the audience will be described in accordance with an embodiment. A method 201 of targeting an advertisement and/or presentation to an audience begins at step 205 in which audience members are identified. Identifying audience members may include obtaining information from various sources, e.g., a ticket purchasing website or a location-aware device.

After audience members are identified, profile information may be obtained for each audience member in step 209. In the described embodiment, each audience member has profile information. It should be appreciated, however, that there may be situations in which audience members do not have profile information. In the event that there is no profile information available for audience members, a system may choose to use previous, e.g., historical, profile information from the same or similar movie at the same or similar time, particularly if multiple previous events effectively had substantially similar targeted advertisements identified as a result of targeting engine analysis. For example, if one showing of a particular movie contains audience profile information that leads to a particular lineup of advertising, that particular lineup may be saved and/or used for unknown audiences of the particular movie.

Once profile information for audience members is obtained, the profile information is processed, e.g., evaluated, in step 213 to determine a group identity for the audience that includes the audience members. The group identity may be an aggregate profile which is representative of the profiles of the audience member, and may include any number of characteristics or indicia. Such characteristics may include, but are not limited to including, demographical information and/or historical information. By way of example, a group identity may be arranged to identify demographical information such as an average age of the audience and/or an average income level of the audience, and historical information such as the types of movies which have previously been viewed by the audience members. It should be appreciated that factors used in determining a group identity for an audience may vary widely.

In general, any suitable algorithm may be used to process profile information such that a group identity may be determined. A suitable algorithm may be a dynamic algorithm that process profile information in real-time, e.g., substantially when an audience is assembled at a concentrated location for an event. Alternatively, a suitable algorithm may be arranged to process profile information before an audience is assembled at a concentrated location for an event. Additionally, a suitable algorithm may be a simple algorithm or a complex algorithm, depending upon the requirements of a particular system. Suitable algorithms may include, but are not limited to including, algorithms which determine mean or substantially average values associated with characteristics, median values associated with characteristics, the most common values of characteristics, the popularity of characteristics, and the like. A mean value for a characteristic may be, for example, a mean income or age of audience members. Similarly, the median value for a characteristic may be, for instance, a median income or age of audience members. In the context of an audience at a movie theater, the popularity of characteristics may include determining the most common movie genre watched by audience members in the previous few months. More generally, the popularity of characteristics may be determined based upon the modes associated with the characteristics At least one advertisement and/or presentation is identified in step 217 based on the group identity. In other words, at least one advertisement and/or presentation that is targeted to the audience, or is otherwise particularly well-suited to the audience based on the group identity, is identified using the group identity. It should be appreciated that any suitable method may generally be used to identify at least one targeted advertisement and/or presentation. In one embodiment, a method may entail accessing a database in which a library of advertisements and/or presentations are stored, and searching through the library using the group identity to find advertisements and/or presentations that are essentially a match for the group identity. An advertisement and/or presentation may be identified as being essentially a match to the group identity if characteristics of the advertisement and/or presentation are consistent with at least some of the characteristics associated with the group identity. By way of example, if a group identity indicates that an audience at a movie has a median age of approximately ten years of age, then an advertisement and/or presentation that is a match to the group identity may be one that is tagged or otherwise identified as being suitable for ten year olds. It should be appreciated that an advertisement and/or presentation may have multiple characteristics associated therewith, and that the number of characteristics which are consistent with characteristics associated with a group identity in order for a match to be identified may vary widely.

Any advertisements and/or presentations identified in step 217 that are targeted to the audience may be added to a queue or list of advertisements and/or presentations in step 221. The queue of advertisements and/or presentations may generally be a set of advertisements and/or presentations that are to be rendered to the audience. The queue may be configured to include substantially only the targeted advertisements and/or presentations. Alternatively, the queue may be configured to include the targeted advertisements and/or presentations, in addition to other advertisements and/or presentations that are to be rendered to the audience. For example, if a fixed number of advertisements and/or presentations are arranged to be rendered to the audience and the number of targeted advertisements and/or presentations in the queue is less than the fixed number, then the queue may also include advertisements and/or presentations that are not targeted to the audience.

In step 225, targeted advertisements and/or presentations that are queued are rendered to the audience. Rendering targeted advertisements and/or presentations to the audience may include displaying or otherwise portraying the targeted advertisements and/or presentations on a display screen that may be viewed by the audience. Upon rendering targeted advertisements and/or presentations to an audience, the method of targeting an advertisement and/or presentation to an audience is completed.

Figure 3:
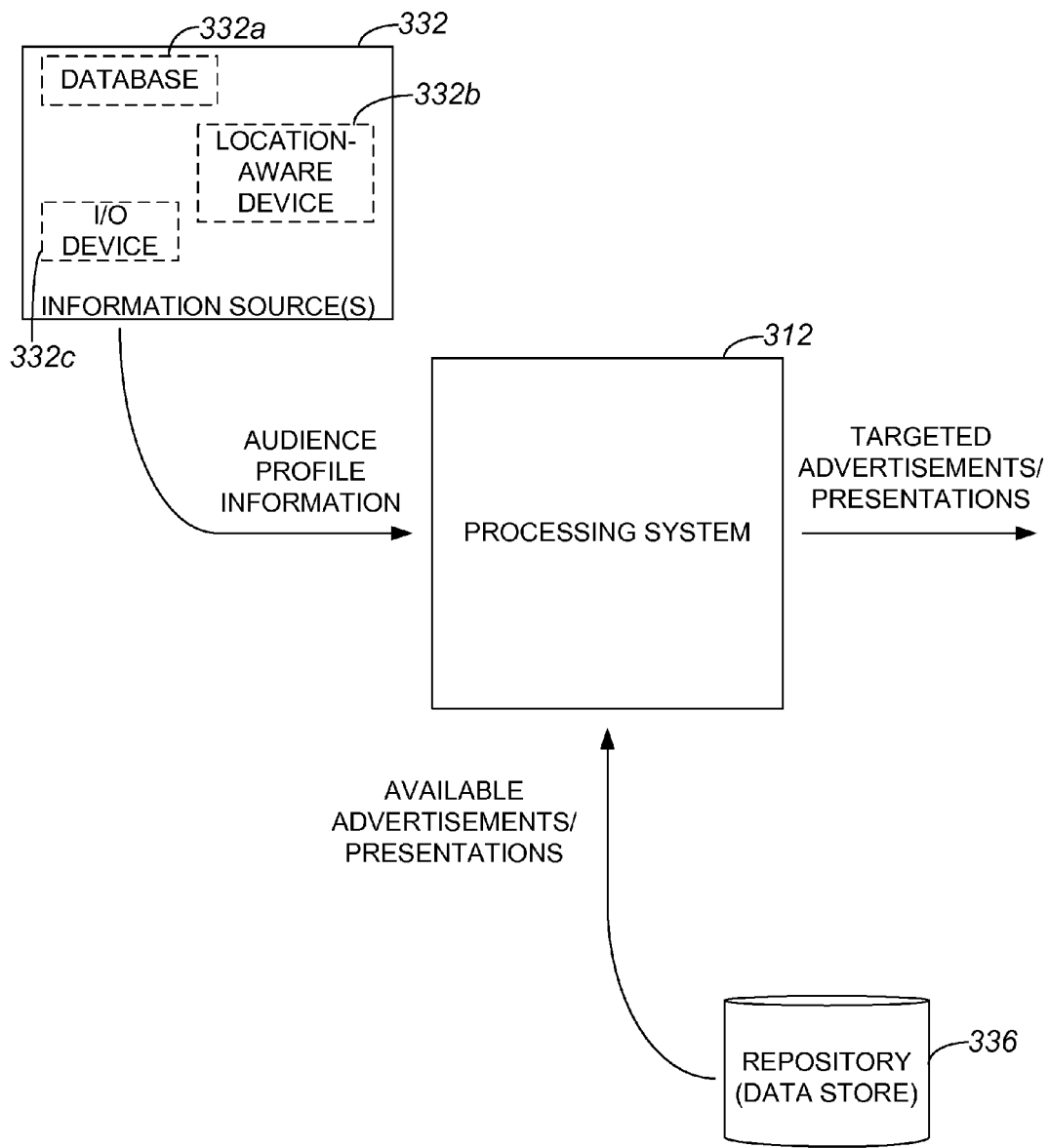
FIG. 3 is a diagrammatic representation of a system that processes audience profile information in accordance with an embodiment.

Profile information, e.g., online identities, relating to members of a group may be obtained from a variety of different sources and processed to identify advertisements and/or presentations that are particularly relevant to the group. FIG. 3 is a diagrammatic representation of a system that processes audience profile information obtained from various sources in accordance with an embodiment. A processing system 312 is generally configured to identify advertisements and/or presentations that are well-suited to, or substantially tailored to, a particular group. Processing system 312 may obtain profile information relating to the group from at least one information source 332, and may process the profile information to determine a group identity. Using the group identity, processing system 312 may identify a set of targeted advertisements and/or presentations that are to be rendered to the group. The set of targeted advertisements and/or presentations may be identified from a repository 336 of substantially all advertisements and/or presentations that are available to processing system 312. One example of a processing system will be discussed in more detail below with respect to FIG. 4.

Information source 332 may include, but is not limited to including, a database 332*a*, a location-aware device 332*b*, and an I/O device 332*c*. Database 332*a* may be, for example, a database that stores information relating to online identities of audience members. Location-aware device 332*b* may be a device that is arranged to identify audience members who are present in an audience, e.g., an audience at a concentrated location. Audience members may be detected or otherwise identified at a location by their RFID tags and/or cell phones, for example. I/O device 332*c* may be a computer terminal at a particular location that allows audience members to log in and identity themselves as being in the audience at the location. In one embodiment, I/O device 332 may also be a scanning device, e.g., a device that may scan an admissions ticket or a magnetic strip on an identification tag. It should be appreciated that I/O device 332*c* may also be arranged to obtain information from purchasing histories, e.g., purchasing histories of consumers who purchase tickets online. Within repository 336, advertisements and/or presentations may be stored with tags or other indicators in order to facilitate the identification of advertisements and/or presentations that are consistent with a group identity. For example, an advertisement and/or presentation may be stored with a tag which identifies an appropriate age group for the advertisement and/or presentation, and a tag which identifies particular income level that is appropriate for the advertisement and/or presentation. Advertisements and/or presentations may generally be tagged on any number of vectors including, but not limited to including, ages, buying histories, online interaction histories, incomes, etc. Tags may also be specific, and may be substantially conditional, e.g., certain advertisements and/or presentations may be tagged as being suitable for an audience if at least a particular percentage of the audience is identified as being interested in the associated subject matter.

Figure 4:
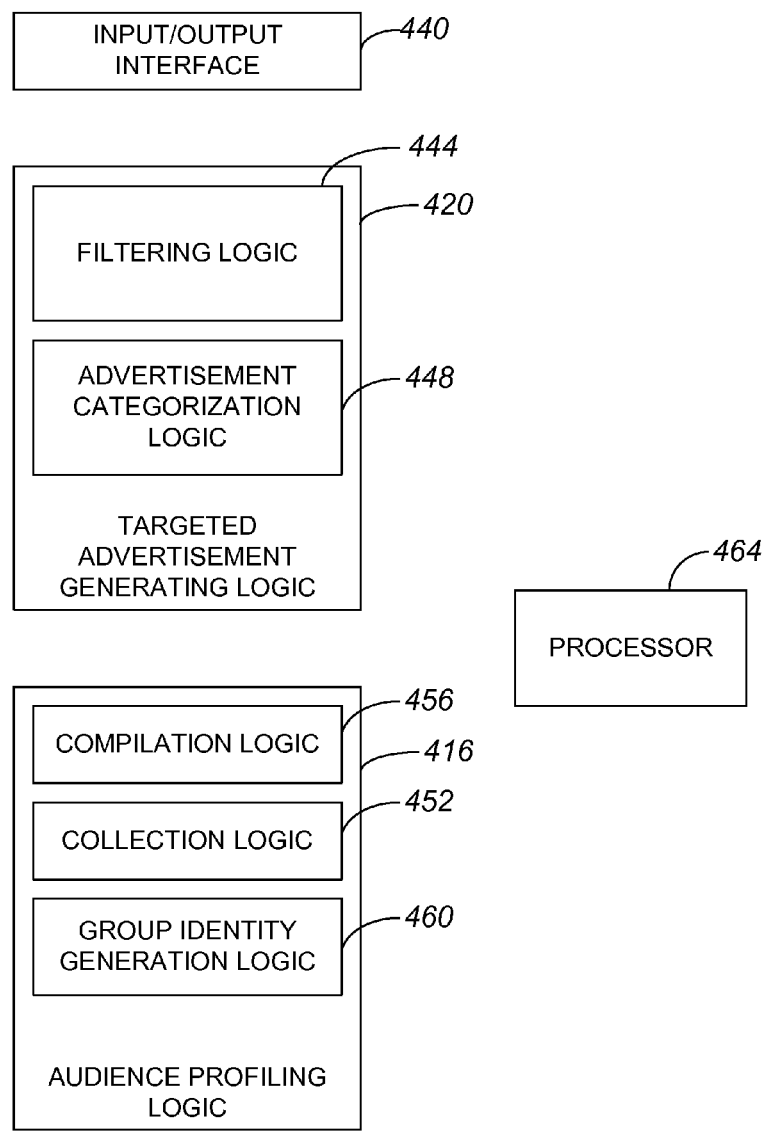
FIG. 4 is a block diagram representation of a processing system or rendering arrangement in accordance with an embodiment.

With reference to FIG. 4, a processing system or rendering arrangement will be described in accordance with an embodiment. A processing system 412, which may generally be a computing system, is configured to determine a group identity for an audience, and to identify advertisements and/or presentations that are targeted to the group identity. In one embodiment, processing system 412 may a computing system that is distributed across a network.

Processing system 412 includes a processor 464, audience profiling logic 416, targeted advertisement generating logic 420, and an input/output interface 440. Processor 464 is generally configured to cooperate with, e.g., execute any computer program code associated with, audience profiling logic 416 and targeted advertisement generating logic 420. Audience profiling logic 416 is generally configured to process profile information relating to audience members to generate a group identity. Targeted advertisement generating logic 420 is generally configured to identify at least one advertisement and/or presentation that is targeted to the group identity generated by profiling logic 416. Input/output interface 440 is typically configured to obtain profile information and to provide at least one advertisement and/or presentation that is targeted to the group identity. It should be appreciated that processing system 412 may also include a storage structure (not shown), e.g., a memory, into which advertisements and/or presentations targeted to the group identity may be queued or otherwise stored.

Audience profiling logic 416 includes collection logic 452, compilation logic 456, and group identity generation logic 460. Collection logic 452 is arranged to cooperate with input/output interface 440 to obtain profile information relating to members of an audience. Compilation logic 456 is arranged to compile the profile information. Group identity generation logic 460 is configured to evaluate the compile profile information to determine an aggregate profile, or group identity.

Targeted advertisement generating logic 420 includes filtering logic 444 and advertisement categorization logic 448. Filtering logic 444 is arranged to filter substantially all available advertisements and/or presentations such that advertisements and/or presentations that are particularly suitable for the group identity are identified. In one embodiment, filtering logic 44 may be configured to identify advertisements and/or presentations that effectively match the group identity, i.e., have characteristics that are consistent with those associated with the group identity. Advertisement categorization logic 448 is arranged to categorize advertisements and/or presentations based upon characteristics of the advertisements and/or presentations. Categorized advertisements and/or presentations may be readily filtered by filtering logic 444.

Input/output interface 440 generally includes input and output ports that allow data to be received and transmitted. For example, an input port of input/output interface 440 may receive profile information relating to an audience member through a network link, while an output port of input/output interface 440 may provide targeted advertisements and/or presentations to a display screen (not shown). Input/output interface 440 may also be arranged to obtain a set of substantially all available advertisements and/or presentations, e.g., from a database (not shown). Input/output interface 440 may also include sensors or the like that are configured to determine the presence of audience members.

Figure 5:
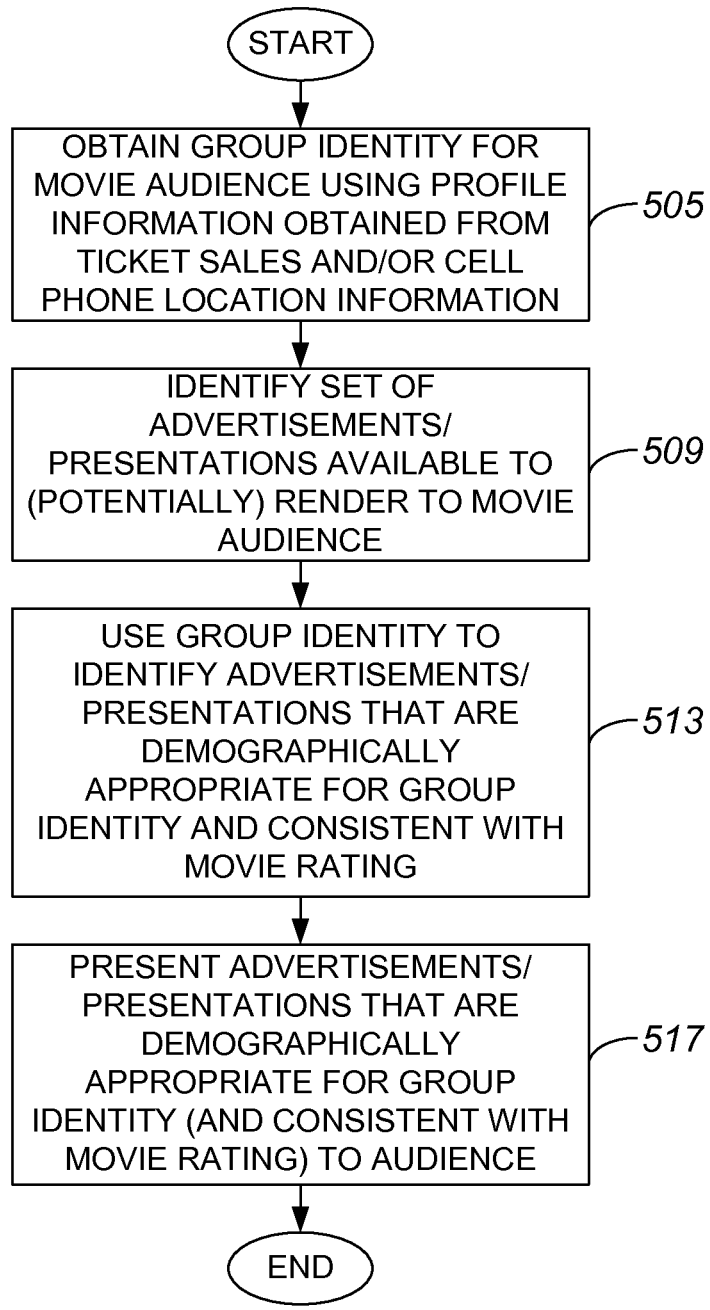
FIG. 5 is a process flow diagram which illustrates a method of selecting advertisements and/or presentations to display at a movie theater based on an audience profile in accordance with an embodiment.

As previously mentioned, advertisements and/or presentations may be targeted to an audience at a showing of a movie at a centralized location such as a movie theater. FIG. 5 is a process flow diagram which illustrates a method of selecting advertisements and/or presentations to display at a showing of a movie at a movie theater based on an audience profile in accordance with an embodiment. A method 501 of selecting advertisements and/or presentations to display at a showing of a movie, such as a movie trailer, begins at step 505 in which a group identity for the movie audience is obtained. In the described embodiment, the group identity is determined using profile information including, but not limited to including, ticket sales information and/or cell phone location information. Ticket sales information may be obtained from websites that sell tickets and from a movie theater box office. Cell phone location information may identify a particular cell phone and, hence, a person that is present in a movie audience. It should be appreciated that the group identity may be dependent on the methods used to aggregate profile information, as well as upon the amount of profile information that is available.

Once the group identity is obtained, a set of advertisements and/or presentations that are available to be rendered to a movie audience is identified in step 509. That is, upon obtaining the group identity, targeted advertisements and/or presentations that are suitable for delivery to the movie audience may be identified. The group identity is used to identity advertisements and/or presentations that are appropriate, e.g., demographically appropriate, for the group identity in step 513. In one embodiment, the identified advertisements and/or presentations are also consistent with a movie rating. By way of example, even if a group identity indicates that a movie audience is generally over seventeen years of age, if the movie being shown has a G rating, then the identified advertisements and/or presentations are substantially limited to those that are appropriate for a G rating.

After advertisements and/or presentations that are targeted to the group identity are identified in step 513, process flow moves to step 517 in which those advertisements and/or presentations are presented to the audience. Presenting the advertisements and/or presentations that are demographically appropriate from the group identity, and consistent with the rating of the movie being shown, may include displaying the advertisements and/or presentations on a movie screen before the movie is shown. The method of selecting advertisements and/or presentations to display at a showing of a movie is completed after the advertisements and/or presentations are presented to the audience.

Although only a few embodiments have been described in this disclosure, it should be understood that the disclosure may be embodied in many other specific forms without departing from the spirit or the scope of the present disclosure. By way of example, advertisements and/or presentations have generally been described as being delivered to audience members. Advertisements and/or presentations may generally be considered to be announcements or broadcasts.

Generally, by compiling profile information of at least some group members, e.g., audience members, in a physical location, a group identity may be formed that broadly represents an overall group. That is, a sample set of group members may be used to determine a group identity of an overall group.

Over time, past or historical information may be used to effectively inform present events without departing from the spirit or the scope of the present disclosure. For instance, using information relating to members of an audience over several seasons at a baseball stadium, advertisements at the baseball stadium may be selected such that the advertisements are likely to be relevant to the audience at a current baseball game at the baseball stadium.

In addition to considering the demographics of audience members when targeting advertising before a movie shown at a movie theater, the general demographics of the geographical location of a movie theater maybe considered. That is, a group identity for an audience may be determined such that the geographical location of a movie theater is factored into the group identity. By way of example, if a movie theater is adjacent to a college campus, the determination of a group identity for an audience may consider the fact that the audience is very likely to include a substantial number of college students. Similarly, if a movie theater is located in a particular ethnic neighborhood, the determination of a group identity for an audience may consider the fact that the audience is highly likely to include residents of the particular ethnic neighborhood.

While rendering targeted advertisements and/or presentations has generally been described in terms of providing such advertisements and/or presentations for display, it should be appreciated that advertisements and/or presentations are not limited to being displayed. That is, targeted advertisements and/or presentations may be rendered into formats that do not include a visual component, or a component that may be displayed for viewing. By way of example, targeted advertisements and/or presentations may be rendered in an audio form such that the advertisements and/or presentations are audibly played out to an audience without departing from the spirit or the scope of the present invention. Thus, targeted advertisements and/or presentations are not limited to being displayed and may, more generally, be presented or conveyed to an audience in any suitable format.

A concentrated location at which an audience is located has generally been described as a physical location, e.g., a movie theater or a baseball stadium. It should be appreciated that a concentrated location may also be a virtual location. By way of example, all participants on a conference call may be considered to be at a concentrated location of a virtual meeting. In the context of a virtual meeting, targeted advertisements and/or presentations may be delivered from a central server such as a conference server to devices that are local to the participants of the conference call.

The filtering logic used to substantially match advertisements and/or presentations to a group identity may vary based on the requirements of a particular system. Typically, the algorithm executed by the filtering logic may be specified by a system administrator.

As mentioned above, a group identity may be indicative of a composite audience member. Hence, the more information that is available for an audience, the more accurate the group identity may be. For example, if a profile of only a small percentage of an audience is known, the group identity may be less indicative of a composite audience member than if the profile of a large percentage of the audience is known. The algorithm executed to determine a group identity based on profile information may be selected, e.g., by a system administrator, based upon factors including, but not limited to including, how much profile information is available.

The ability to determine a group identity for an audience before an audience is gathered in a concentrated location provides for opportunities to sell advertising space or time for products and the like that essentially match the group identity. For instance, in the context of a baseball game to which advance tickets are sold online, a group identity for ticket purchasers may be used to identify advertisers that may wish to purchase advertising time at the baseball game. That is, specific advertising that is targeted to the ticket purchasers may be sold based upon the group identity.

In general, an advertisement and/or presentation may be identified as substantially being a match to a group identity if one characteristic of the advertisement and/or presentation matches one characteristic of the group identity. It should be appreciated, however, that in some embodiments, an advertisement and/or presentation may not be considered to be a match to a group identity unless substantially all identified characteristics of the advertisement and/or presentation effectively match characteristics of the group identity. Criteria used to determine whether an advertisement and/or presentation is a match to and, hence, appropriate for, a group identity may vary widely depending upon the requirements of a particular system without departing from the spirit or the scope of the disclosure. An audience may have multiple, substantially distinct profiles associated therewith. For example, at a rated G movie, the children at the movie may have a distinct profile from the adults at the movie. When an audience has multiple profiles associated therewith, the advertisements shown to the audience may not necessarily be targeted at one profile or another. In one embodiment, advertisements may be selected such that some of the advertisements are targeted to one profile and other advertisements are targeted to another profile.

The embodiments may be implemented as hardware and/or software logic embodied in a tangible medium that, when executed, is operable to perform the various methods and processes described above. That is, the logic may be embodied as physical arrangements or components. A tangible medium may be substantially any computer-readable medium that is capable of storing logic which may be executed, e.g., by a computing system, to perform methods and functions associated with the embodiments. Such computer-readable mediums may include, but are not limited to including, physical storage and/or memory devices. Executable logic may include code devices, computer program code, and/or executable computer commands or instructions.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   determining a group identity, the group identity being indicative of at least one characteristic of an audience, the audience being associated with an event;
   accessing a plurality of announcements, the plurality of announcements being available for delivery to the audience during the course of the event;
   identifying at least one announcement of the plurality of announcements based on the group identity, wherein identifying the at least one announcement of the plurality of announcements based on the group identity includes processing the plurality of announcements to identify the at least one announcement of the plurality of announcements that approximately matches the group identity; and
   providing the at least one announcement to the audience at the event.

2. The method of claim 1 wherein the audience includes at least one audience member, and determining the group identity includes obtaining profile information associated with the at least one audience member and processing the profile information to generate the group identity.

3. The method of claim 2 wherein the group identity is an indication of demographics associated with the audience.

4. The method of claim 2 wherein the profile information is obtained from at least one of selected from a group including a database, an input/output device, and a location-aware device.

5. The method of claim 1 wherein the event is associated with a concentrated location.

6. The method of claim 5 wherein the event is a movie showing and the concentrated location is a movie theater.

7. The method of claim 1 wherein providing the at least one announcement to the audience includes rendering the at least one announcement for the audience.

8. The method of claim 1 wherein identifying the at least one announcement of the plurality of announcements based on the group identity includes targeting the at least one announcement to the group identity.

9. The method of claim 1 wherein the at least one announcement is one selected from a group including at least one advertisement and at least one presentation.

10. A non-transitory computer-readable medium comprising computer program code, the computer program code, when executed, configured to:
determine a group identity, the group identity being indicative of at least one characteristic of an audience, the audience being associated with an event;
access a plurality of announcements, the plurality of announcements being available for delivery to the audience during the course of the event;
identify at least one announcement of the plurality of announcements based on the group identity, wherein the computer program code configured to identify the at least one announcement of the plurality of announcements based on the group identity is further configured to process the plurality of announcements to identify the at least one announcement of the plurality of announcements that approximately matches the group identity; and
providing the at least one announcement to the audience at the event.

11. The non-transitory computer-readable medium of claim 10 wherein the audience includes at least one audience member, and the computer program code configured to determining the group identity is configured to obtain profile information associated with the at least one audience member and to process the profile information to generate the group identity.

12. The non-transitory computer-readable medium of claim 11 wherein the group identity is an indication of demographics associated with the audience.

13. The non-transitory computer-readable medium of claim 11 wherein the profile information is obtained from at least one of selected from a group including a database, an input/output device, and a location-aware device.

14. The non-transitory computer-readable medium of claim 10 wherein the event is associated with a concentrated location.

15. The non-transitory computer-readable medium of claim 14 wherein the event is a movie showing and the concentrated location is a movie theater.

16. The non-transitory computer-readable medium of claim 10 wherein the computer program code configured to provide the at least one announcement to the audience is configured to render the at least one announcement for the audience.

17. The non-transitory computer-readable medium of claim 10 wherein the computer program code configured to identify the at least one announcement of the plurality of announcements based on the group identity is configured to target the at least one announcement to the group identity.

18. The non-transitory computer-readable medium of claim 10 wherein the at least one announcement is one selected from a group including at least one advertisement and at least one presentation.

19. An apparatus comprising:
means for determining a group identity, the group identity being indicative of at least one characteristic of an audience, the audience being associated with an event;
means for accessing a plurality of announcements, the plurality of announcements being available for delivery to the audience during the course of the event;
means for identifying at least one announcement of the plurality of announcements based on the group identity, wherein the means for identifying the at least one announcement of the plurality of announcements based on the group identity include means for processing the plurality of announcements to identify the at least one announcement of the plurality of announcements that approximately matches the group identity; and
means for providing the at least one announcement to the audience at the event.

20. An apparatus comprising:
an input/output interface, the input/output interface being configured to obtain profile information associated with a plurality of members of an audience, the input/output interface further being configured to deliver at least one targeted announcement to the audience;
audience profiling logic, the audience profiling logic being arranged to process the profile information to generate a group identity, the group identity being representative of characteristics of the audience; and
targeted advertisement generating logic, the targeted advertisement generating logic being arranged to identify the least one targeted announcement with at least one characteristic that is consistent with the group identity.

21. The apparatus of claim 20 wherein the audience is associated with an event occurring at a concentrated location.

22. The apparatus of claim 20 wherein the representative characteristics of the audience include demographic and behavioral information associated with the audience.

23. The apparatus of claim 20 wherein the input/output interface is configured to obtain the profile information from at least one selected from a group including a database, a location-aware device, and an input/output device.

24. The apparatus of claim 20 wherein the at least one targeted announcement includes at least one selected from a group including an advertisement and a presentation.

* * * * *